Nov. 2, 1926.
J. M. BURKHALTER
1,605,705
CULTIVATOR ATTACHMENT
Filed July 11, 1925   2 Sheets-Sheet 2
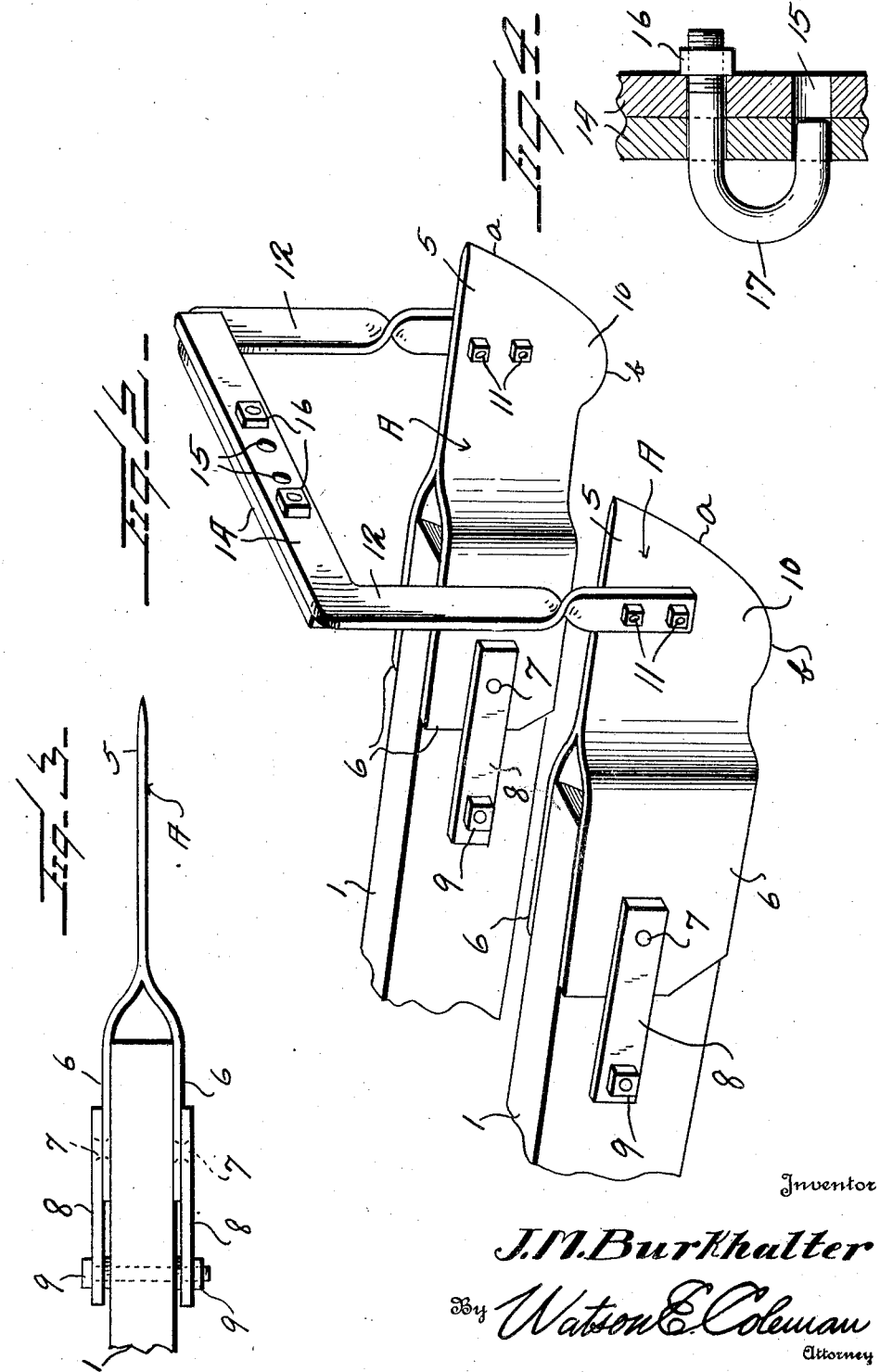
Inventor
J. M. Burkhalter
By Watson E. Coleman
Attorney Patented Nov. 2, 1926.

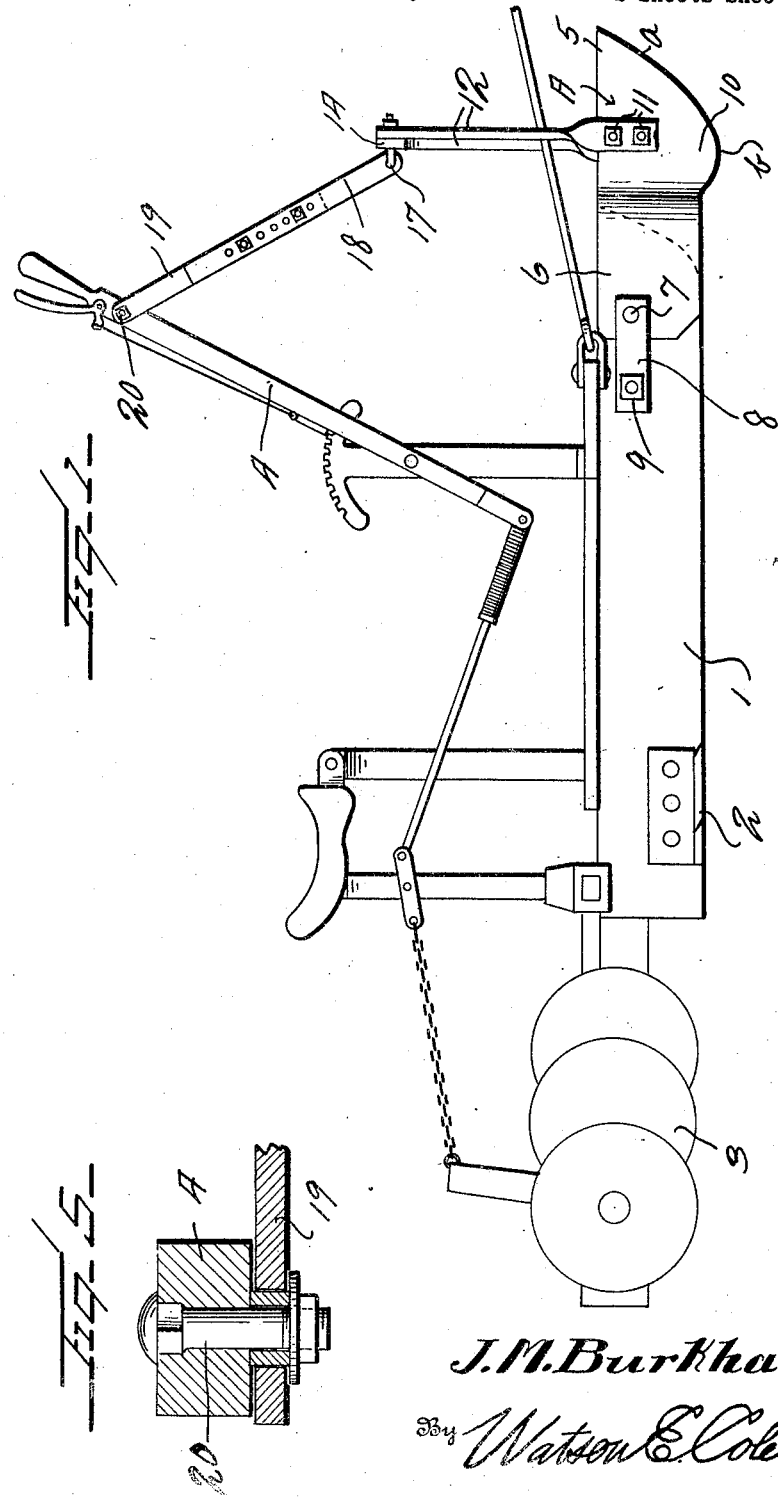

1,605,705

UNITED STATES PATENT OFFICE.

JOHN M. BURKHALTER, OF CANYON, TEXAS.

CULTIVATOR ATTACHMENT.

Application filed July 11, 1925. Serial No. 43,015.

This invention relates to certain improvements in cultivator attachments and it is an object of the invention to provide an attachment of this character which operates to open a furrow or to break up clods or the like which may be within a lister furrow.

It is also an object of the invention to provide an attachment of this kind adapted to be employed in connection with a cultivator having weed cutting knives and which attachment operates in advance of the knives to open a furrow whereby the knives are assured of working below the ground surface at a depth whereby the destruction of the weeds is assured.

Another object of the invention is to provide an attachment of this kind embodying means whereby the depth of penetration or cutting of the attachment may be readily regulated in accordance with the requirements of practice.

The invention consists in the details of construction and in the combination and arrangement of the several parts of my improved cultivator attachment whereby certain important advantages are attained and the device rendered simpler, less expensive and otherwise more convenient and advantageous for use, as will be hereinafter more fully set forth.

The novel features of my invention will hereinafter be definitely claimed.

In order that my invention may be the better understood, I will now proceed to describe the same with reference to the accompanying drawings, wherein:—

Figure 1 is a view in side elevation illustrating an attachment constructed in accordance with an embodiment of my invention applied to a slide cultivator or go-devil;

Figure 2 is a view in perspective of my improved attachment in applied position as disclosed in Figure 1, with certain of the parts omitted;

Figure 3 is a view in top plan of one of the openers or plows comprised in my improved attachment;

Figure 4 is an enlarged fragmentary view partly in section and partly in plan illustrating a hook bolt for maintaining the sections of the arch in assembled relation;

Figure 5 is an enlarged fragmentary view partly in section and partly in plan illustrating the connection as herein disclosed between an elongated member and lever of the cultivator.

As disclosed in the accompanying drawings, 1 denotes the runners of a slide cultivator or go-devil of a well known type wherein the rear portion of each of the runners 1 is provided with the outstanding weed cutting blade or knife 2 and which is provided at its rear with the gang cultivating discs 3 adapted to be vertically adjusted through the medium of the lever 4. As these features just referred to are well known a detailed description and illustration thereof is believed to be unnecessary.

My improved attachment comprises the openers or plows A which, as herein disclosed, are operatively connected with the forward end portions of the runners 1. Each of the openers or plows A as herein disclosed comprises a plate 5 having its flat faces vertically disposed when in applied position and the rear of the plate 5 is provided with the spaced extension plates 6 which are adapted to receive therebetween the forward end portion of a runner 1. Each of these plates 6 has pivotally connected thereto, as at 7, an end portion of a rigid strap 8 the opposite end portion of which being pivotally connected, as at 9, with the runner 1. This connection between the plates 6 and the runner 1 as afforded by the strap 8 permit the opener or plow A to be readily raised or lowered as the requirements of practice may necessitate.

The forward edge $a$ of the plate 5 is disposed on a predetermined downward and inward curvature which is continued by the edge $b$ of a depending flange 10 carried by the outer portion of the plate 5, said flange 10 being preferably parti-circular in form although I do not wish to be understood as limiting myself to this exact configuration.

Bolted, as at 11, or otherwise connected to the upper portions of the openers or plows A are the upstanding arms 12 the upper ends of which terminating in the inwardly disposed extension arms 14 in overlapping relation. The extension arms 14 are provided therealong with the spaced openings 15 through which are adapted to be selectively inserted the holding bolts 16. When the arms 12 and 14 are in assembled relation an arch member is provided which connects the openers or plows A for unitary swinging movement in a vertical direction and the relative adjustment of the extension arms 14 permits the attachment to be applied to cultivators of various widths.

One of the bolts 16 is provided with a hook head 17, as particularly illustrated in Figure 4, which provides an eye with which is pivotally connected an end portion of an arm 18. The opposite end portion of this arm 18 overlaps the inner end portion of a second arm 19, the outer end extremity of said arm 19 being pivotally connected, as at 20, to the lever 4 hereinbefore referred to. By this means, it will be readily noted that when the lever 4 is operated to raise or lower the gang discs 3 the openers or plows A will be correspondingly raised or lowered. As illustrated in Figure 1, the extent of movement of the plows or openers A and the gang discs 3 is substantially the same but by adjusting the arms 18 and 19 outwardly one with respect to the other, the openers or plows A will be caused to penetrate to a depth greater than that of the discs 3 or by adjusting said arms 18 and 19 inwardly one with respect to the other, the discs 3 will be caused to penetrate to a depth greater than that of the openers or plows A.

In practice, my improved attachment operates to open the ground or cut a furrow in advance of the runners 1 so that said runners will drop a decided extent below the normal surface of the land whereby the weed cutters or blades 2 will be caused to work in the sub-soil and thereby effectively destroy weeds and the like, it being understood that the depth of the furrow cut by the openers or plows will be dependent upon the conditions. This operation is particularly true when working on flat land.

When working in lister furrows, the openers or plows A operate to effectively break clods or the like which may be within such furrows to assure the cultivator proper running steady and to the best advantage, the openers or plows A being adjusted downwardly in accordance with the extent to which said lister furrows may be filled. In relatively clear lister furrows, the openers or plows A are substantially straight ahead as illustrated in Figure 1 of the accompanying drawings so that the depending flange 10 of each of the openers or plows A will assure the effective breaking of the clods or the like which may be within such lister furrow.

While I have herein described and illustrated my improved attachment as being employed in connection with a slide cultivator or go-devil, it is to be understood that it can be employed in connection with cultivators of other types.

From the foregoing description it is thought to be obvious that a cultivator attachment constructed in accordance with my invention is particularly well adapted for use by reason of the convenience and facility with which it may be assembled and operated, and it will also be obvious that my invention is susceptible of some change and modification without departing from the principles and spirit thereof and for this reason I do not wish to be understood as limiting myself to the precise arrangement and formation of the several parts herein shown in carrying out my invention in practice except as hereinafter claimed.

I claim:—

1. In combination with a cultivator including supporting runners and ground working means having vertical movement, a lever for raising said means, a plow positioned in advance of each of the runners, means for pivotally connecting the plow to said runner, and an operative connection between the plow and the lever of the cultivator for raising and lowering the plow upon operation of such lever.

2. In combination with a cultivator including supporting runners and ground working means having vertical movement, a lever for raising said means, a plow positioned in advance of each of the runners, means for pivotally connecting the plow to said runner, and an operative connection between the plow and the lever of the cultivator for raising and lowering the plow upon operation of such lever, said plow comprising a plate having its flat faces vertically disposed.

3. In combination with a cultivator including supporting runners and ground working means having vertical movement, a lever for raising said means, a plow positioned in advance of each of the runners, means for pivotally connecting the plow to said runners, and an operative connection between the plow and the lever of the cultivator for raising and lowering the plow upon operation of such lever, said plow comprising a plate having its flat faces vertically disposed, the forward portion of said plate being provided with a depending flange.

4. In combination with a cultivator including supporting runners and ground working means having vertical movement, a lever for raising said means, a plow positioned in advance of one of the runners, means for pivotally connecting the plow to said runner, an arm operatively engaged with the plow, a second arm operatively engaged with the lever, opposite ends of the arms overlapping, and means for maintaining said arms in adjusted position one with respect to the other.

5. In combination with the runners of a slide cultivator, furrow openers positioned in advance of the runners, each of said furrow openers comprising a plate, the rear portion of which being provided with spaced plates to receive therebetween the forward portion of a runner, straps pivotally connected to the spaced plates and the runner to permit the opener to have vertical movement, and means to raise and lower the openers.

In testimony whereof I hereunto affix my signature.

JOHN M. BURKHALTER.